Nov. 6, 1934.   D. L. MAKER   1,979,895
HUB CAP MOUNTING
Filed June 30, 1930

Inventor
Dewey L. Maker
By Blackmore, Spencer & Fluke
Attorneys

Patented Nov. 6, 1934

1,979,895

UNITED STATES PATENT OFFICE 1,979,895

HUB CAP MOUNTING

Dewey L. Maker, Detroit, Mich., assignor, by mesne assignments, to Kelsey-Hayes Wheel Corporation, a corporation of New York Application June 30, 1930, Serial No. 464,800

3 Claims. (Cl. 301—37)

This invention relates to wheel hubs and has particular reference to an improved cover for the hub.

In modern automotive vehicle practice where it is desired to construct a small light vehicle, the parts must necessarily be as small and light as is practically possible. At the same time, it is very desirable to give to these parts the appearance of large size. Accordingly, in cases where a small wheel hub is used, a light cover is employed which extends over the hub and to which a relatively large hub cap is secured to give the effect of size. In the past, the cover has been constructed of a number of pieces which made the structure relatively expensive.

It is the object of the present invention to construct a cover which is formed of but a single piece and which eliminates one of the pieces of the most preferred of prior constructions and yet retains the function thereof. The object of the invention is accomplished by forming a cup-shaped metallic member having an opening in the bottom of the cup to receive the axle. The rim of the cup fits over the inner portion of the hub while the bottom of the cup or the flange of the cover abuts the outer portion of the hub. The tongue pressed from the flange or the bottom of the cup, extends into a keyway of the hub and axle. The tongue positions the cover and holds it in place. The outer bottom portion of the cover or cup is rolled into thread shape and receives the threaded portion of the hub cap which conceals the end of the axle.

Figure 1:
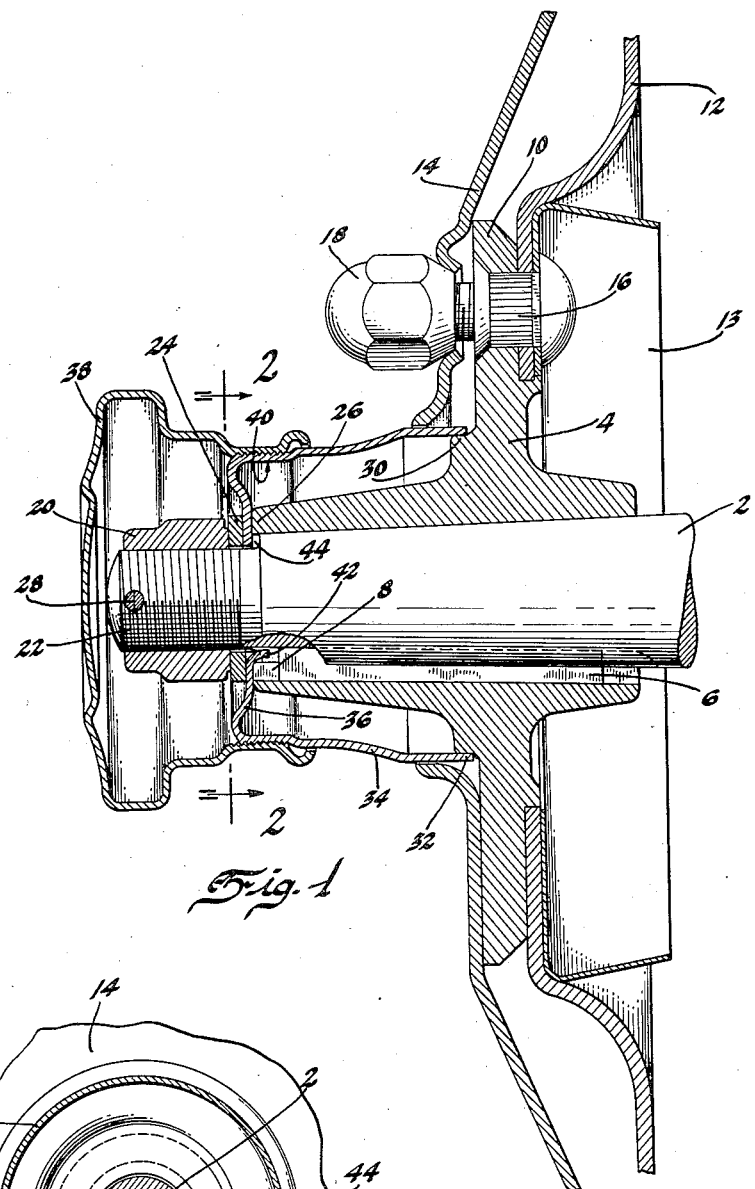
Figure 1 is a section through a wheel showing the novel cover of the invention and showing the axle in full lines.
Figure 2:
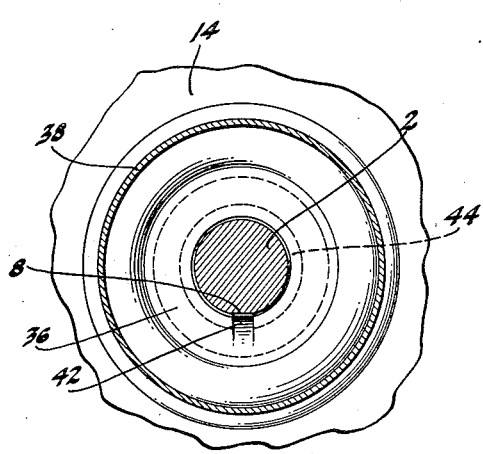
Figure 2 is a section on the line 2—2 of Figure 1.

Referring to the drawing, the numeral 2 indicates an axle having the wheel hub 4 secured thereto by means of the key 6 fitting in the keyway 8 formed in the axle 2 and the hub 4. The hub 4 has the annular flange 10 to which there is secured the brake drum 12, oil deflector and dust guard 13, and the demountable disc wheel 14. The rivets 16 hold the brake drum and oil deflector to the flange 10 while the headed machine bolts 18 removably secure the disc wheel 14 in place. The hub is retained on the axle by means of the nut 20 screwed onto the threaded end 22 of the axle. A washer 24 is interposed between the nut 20 and the end 26 of the hub 4 and a pin 28 is used to lock the nut 20 in place.

The hub 4 is provided with an annular shoulder 30 over which there is received the end 32 of a hub cover 34 which is cup-shaped and has the cup bottom or annular inturned flange 36 at its outer end. The flange extends inwardly between the washer 24 and the end 26 of the hub and when the nut 20 is screwed home, the flange 36 will be rigidly held in place. A hub cap 38 is screwed onto the threaded portion 40 of the cover 34, the threads of the cover being preferably formed by rolling. The advantage of the rolled thread is that none of the metal is removed and the strength of the cover thereby retained.

A tongue 42 at the opening 44 in the bottom of the cup or cover 34 extends into the keyway 8. The tongue 42 positions the cover 34 and holds it in place.

In prior constructions, the cover 34 has been formed in two pieces, one of which extended from the shoulder 30 to the flange 36 of the cover. The second member included the flange 36 and a threaded portion extending away from the hub. On this threaded extension, the cap 38 was threaded. The body of the cover and the threaded extension were secured together in any suitable way. In the present invention but a single member is used which makes the construction considerably less expensive, eliminates the threading of the hub, makes a lighter hub forging and allows for a rolled thread on the sleeve.

I claim:

1. In combination with a wheel and its hub, an axle to which said hub is secured by means of a key in a keyway in both axle and hub, a cover for said hub, said cover having its end portions bearing on said hub, a tongue on one end portion extending into said keyway, and a hub cap secured to said cover.

2. In combination with a wheel and its hub, an axle to which said hub is secured by means of a key in a keyway in both axle and hub, a cover for said hub, a flange on one end of said cover, said flange and the opposite end of said cover bearing on said hub, a tongue on said flange extending into said keyway, and a hub cap secured to said cover.

3. The combination with an axle having a recess therein, of a vehicle wheel having a hub provided with a barrel portion sleeved upon the axle and having a recess therein registrable with the recess in the axle to form with the latter a keyway, an annular shoulder encircling the barrel portion and spaced outwardly therefrom, a cover for the hub extending over the barrel portion and having the rear end sleeved upon the annular shoulder, a flange extending inwardly from the forward end of the cover embracing the front end of the barrel portion and provided with a tongue engageable within said keyway.

DEWEY L. MAKER.